Patented June 13, 1950

2,511,476

UNITED STATES PATENT OFFICE 2,511,476

N-ISOPROPYL DI-(ALKOXYMETHOXY-ALKYL) AMINES

Donald J. Loder and William F. Gresham, Wilmington, Del., assignors to E. I. du Pont de Nemours & Company, Wilmington, Del., a corporation of Delaware No Drawing. Application December 9, 1947, Serial No. 790,712

4 Claims. (Cl. 260—584)

This invention relates to a synthesis of N-alkyl-(alkoxyalkoxyalkyl) amines by the alkylation of (alkoxyalkoxyalkyl) amines and more particularly to the synthesis of N-alkyl substituted (alkoxyalkoxyalkyl) amines by alkylating an (alkoxyalkoxyalkyl) amine in the presence of hydrogen and an alkylating agent. This application is a continuation in part of S. N. 548,802, filed August 9, 1944 now abandoned.

An object of the present invention is to provide a process for the alkylation of (alkoxyalkoxyalkyl) amines by hydrogenating such amines in the presence of an aldehyde or a ketone. Another object is to provide new compositions of matter resulting from the alkylation of (alkoxymethoxyethyl) amines by hydrogenating the amines in the presence of aldehydes and a suitable hydrogenation catalyst. A further object is to provide suitable reaction conditions and catalysts for conducting these alkylation reactions. Other objects and advantages of the invention will hereinafter appear.

The process is conducted by passing an (alkoxyalkoxyalkyl) amine, or a reactant which forms such an amine during hydrogenation, such as an (alkoxyalkoxy) acetonitrile, and an alkylating agent such as an aldehyde, or a ketone, into a reaction zone and in the presence of a suitable hydrogenation catalyst, effecting the reaction in the presence of hydrogen. These amines can be made by the processes described in the U. S. Patents of Loder et al. 2,398,757 and 2,425,628 issued April 16, 1946, and August 12, 1947, respectively.

The (alkoxyalkoxyalkyl) amines which may be alkylated in accord with this invention include, more particularly, the (alkoxymethoxyalkyl)-amines such as (methoxymethoxyethyl) amine, di-(isobutoxymethoxyethyl) amine, di-(ethoxymethoxyethyl) amine, as well as the unsymmetrical alkyl amines such as methyl, (methoxymethoxyethyl) amine, and the higher alkyl unsymmetrical (alkoxyalkoxyalkyl) amines of this type, such as the (alkoxyalkoxypropyl) amines, (alkoxyalkoxybutyl) amines, etc.

In place of the aforesaid amines there may be used compounds which, under reaction conditions, form the amines such as the corresponding acetonitriles, for example, the (alkoxyalkoxy)-acetonitriles and especially the (alkoxymethoxy) acetonitriles such as (methoxymethoxy) acetonitrile, (ethoxymethoxy) acetonitrile and the like.

The reaction may be conducted in the presence or absence of an inert solvent. Water or inert organic solvents may be used if they are solvents for the (alkoxyalkoxyalkyl) amine being alkylated, as well as for the alkylated product obtained, and it has been found that for this purpose there may be used the lower molecular weight aliphatic alcohols, e. g., methanol, ethanol, the propanols, the butanols, and also the higher aliphatic straight- and branched-chain alcohols; the aliphatic ethers, for example, dimethyl, diethyl, dipropyl, and the higher symmetrical and unsymmetrical ethers; and the acetals, for example, methylal, ethylal and 1,3-dioxolane.

The presence of the aforesaid inert solvent inhibits the formation of side reactions, and consequently, assists in directing the course of the reaction toward the desired alkylated product. The inert solvent may be present in amounts of 1 to 3 parts by weight thereof per part of the (alkoxyalkoxyalkyl) amine. Methylation of (alkoxyalkoxyalkyl) amines and also isopropylation do not require the presence of a solvent, however, although solvents may be used.

The alkylating agent may be an aldehyde or a ketone. If methyl groups are to be inserted in the compound to be reacted, formaldehyde; if ethyl groups, acetaldehyde; if propyl, propanol; if isopropyl, acetone may be employed as the alkylating agent and, similarly, if higher molecular weight alkyl groups are to be inserted, higher molecular weight alkylating agents should be employed such, for example, as the butanals, and the higher symmetrical and unsymmetrical aliphatic aldehydes. Stoichiometrical amounts of the aldehyde are used as the alkylation is substantially quantitative. Higher or lower amounts, however, are within the scope of the invention. If desired, higher molecular weight ketones may be employed such, for example, as methylethyl ketone, diethyl ketone and the higher straight- and branched-chain ketones. The alkylation is substantially quantitative when formaldehyde is used, but with ketones an excess is required due to hydrogenation as, for example, the hydrogenation of acetone to isopropanol. From 0.2 to 3 moles of the aldehyde per mole of amine may be used with good results. The ketones are, accordingly, present in amounts of 5 to 10% above the stoichiometrical requirements.

The reaction is preferably conducted in the liquid phase and in the presence of a suitable hydrogenation catalyst such, for example, as nickel, cobalt, fused nickel cobalt, copper chromite catalyst or other hydrogenation catalysts known to be useful in the hydrogenation of nitriles to amines. The reaction may, however, if desired, be conducted in the vapor phase and in either phase may be carried out at a temperature ranging between 25 and 200° C. and a pressure which is not critical of from 1 to 1000 atmospheres. It is preferred, however, to conduct the alkylation of the (alkoxyalkoxyalkyl) amines, or the (alkoxyalkoxy) acetonitriles, at temperatures between 50 and 150° C. and under a pressure between 20 and 750 atmospheres.

More detailed practice of the invention is illustrated by the accompanying examples of preferred embodiments of the invention in which parts are by weight unless otherwise indicated.

Methylation of di-(isobutoxymethoxyethoxy-ethyl)amine $(C_4H_9OCH_2OCH_2CH_2)_2NH + CH_2O + H_2 \rightarrow$
$(C_4H_9OCH_2OCH_2CH_2)_2NCH_3 + H_2O$

Example 1

A silver-lined shaker tube was charged with 69.3 parts of di-(isobutoxymethoxyethyl)amine, 8 parts of formaldehyde, 50 parts of methanol and 20 parts of a nickel catalyst deposited on kieselguhr. The catalyst was prepared by precipitating nickel nitrate with sodium carbonate on kieselguhr, washing free from alkali and reducing the dried precipitate with hydrogen at a temperature between 300 and 500° C. The reaction was conducted at a temperature of 102° C., under a hydrogen pressure of 400 atmospheres, for about 1 hour. The reaction product, after discharging the pressure, was distilled under reduced pressure and a 96% conversion of the di-(isobutoxymethoxyethyl)amine to the N-methyl alkylated derivative thereof was obtained.

Example 2

The process of Example 1 was repeated using 64 parts of di-(isobutoxymethoxyethyl)amine, 7.3 parts of formaldehyde, 50 parts of methanol and 20 parts of the nickel catalyst. The reaction was conducted at a temperature between 100 and 114° C., under a hydrogen pressure between 450 and 750, for approximately 1½ hours. A 97.5% conversion of the amine to the N-methyl derivative thereof was obtained.

Example 3

The process of Example 1 was repeated using 85 parts of the di-(isobutoxymethoxyethyl) amine, 10.1 parts of formaldehyde, 62 parts of methanol and 20 parts of the nickel catalyst. The reaction was conducted at 100° C. under a hydrogen pressure of 645 atmospheres and for about 2 hours. A 95.8% conversion to the N-methyl amine was realized.

Ethylation of di-(ethoxymethoxyethyl)amine with acetaldehyde $(C_2H_5OCH_2OCH_2CH_2)_2NH + CH_3CHO + H_2 \rightarrow$
$(C_2H_5OCH_2OCH_2CH_2)_2NCH_2CH_3 + H_2O$

Example 4

The process of Example 1 was repeated employing 48.6 parts of di-(ethoxymethoxyethyl)amine, 19.3 parts of acetaldehyde and 7 parts of the nickel catalyst. The reaction was conducted at a temperature between 80 and 107° C., a hydrogen pressure of approximately 30 atmospheres and for about 1 hour. A fair yield of the N-ethyl derivative was obtained by distillation of the product.

Example 5

The process of Example 1 was repeated employing twenty-five parts of di-(ethoxymethoxyethyl)amine, 50 parts of methanol, 4.97 parts of acetaldehyde and 8 parts of the nickel catalyst at a temperature between 99 and 102° C. and at a hydrogen pressure of 30 atmospheres for about 1 hour. A 22.4% conversion of the amine to the N-ethyl substituted amine was realized.

Isopropylation of di-(ethoxymethoxyethyl)amine $(C_2H_5OCH_2OCH_2CH_2)_2NH + CH_3COCH_3 + H_2 \rightarrow$
$(C_2H_5OCH_2OCH_2CH_2)_2NCH(CH_3)_2 + H_2O$

Example 6

The process of Example 1 was repeated employing 18 parts of di-(ethoxymethoxyethyl)amine, 10 parts of acetone and 3 parts of the nickel catalyst. The reaction was conducted at a temperature of 100° C. under a hydrogen pressure of about 100 atmospheres for 1 hour. A 69% conversion to the N-isopropyl substituted amine was obtained.

Isopropylation of di-(isobutoxymethoxyethyl)amine $(C_4H_9OCH_2OCH_2CH_2)_2NH + CH_3COCH_3 + H_2 \rightarrow$
$C_4H_9OCH_2OCH_2CH_2)_2NCH(CH_3)_2 + H_2O$

Example 7

The process of Example 1 was repeated using 55.4 parts of di-(isobutoxymethoxyethyl)amine, 30.2 parts of acetone and 13 parts of the nickel catalyst. Reaction was conducted at a temperature between 100 and 102° C. under hydrogen pressure of 30 atmospheres and for 0.7 hour. A 23.9% conversion to the N-isopropyl substituted amine was obtained.

Hydrogenation and methylation of (ethoxymethoxy)-acetonitrile $C_2H_5OCH_2OCH_2CN + 3H_2 + CH_2O \rightarrow$
$(CH_3)_2N(CH_2CH_2OCH_2OC_2H_5) + H_2O$

Example 8

The process of Example 1 was repeated using 40 parts of (ethoxymethoxy)acetonitrile, 56.8 parts of 37% aqueous formaldehyde, 40 parts of methanol and 13 parts of a nickel alloy skeleton catalyst obtained by dissolving 85% of the aluminum from an aluminum nickel alloy which contained, prior to leeching, 54% nickel and 46% aluminum. The reaction was conducted at a temperature of between 60 and 91° C. under a hydrogen pressure of 30 atmospheres for about 0.5 hour. 14 parts of the N-dimethyl-substituted amine, 6.7 parts of a mixture of alkylated amines and 13.2 parts of higher boiling materials were obtained.

Hydrogenation and isopropylation of (ethoxymethoxy)-acetonitrile $C_2H_5OCH_2OCH_2CN + 3H_2 + CH_3COCH_3 \rightarrow$
$(CH_3)_2CHNH(CH_2CH_2OCH_2OC_2H_5) + H_2O$

Example 9

The process of Example 1 was repeated using 40 parts of (ethoxymethoxy)acetonitrile, 81 parts of acetone and 12 parts of the nickel catalyst. The reaction was conducted at a temperature between 59 and 89° C., under a hydrogen pressure of about 30 atmospheres and for about 1 hour. The N-isopropyl substitution product was obtained in a 73.5% conversion.

Methylation of 2-(ethoxymethoxypropyl)amine $C_2H_5OCH_2OCHCH_3CH_2NH_2 + CH_2O + 2H_2 \rightarrow$
$C_2H_5OCH_2OCHCH_3CH_2N(CH_3)_2 + 2H_2O$

Example 10

The process of Example 1 was repeated using 60 parts of 2-(ethoxymethoxypropyl)amine, 25.4 parts of formaldehyde, 60 parts of methanol and 20 parts of the nickel catalyst. The reaction was conducted at a temperature between 25 and 92° C.

under a hydrogen pressure of 400 atmospheres for 0.2 hour. The N-dimethyl substitution product was obtained in a conversion of 89.5%.

Methylation of di-2-(ethoxymethoxypropyl)amine

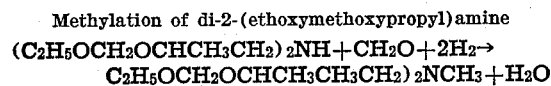

$$(C_2H_5OCH_2OCHCH_3CH_2)_2NH + CH_2O + 2H_2 \rightarrow$$
$$C_2H_5OCH_2OCHCH_3CH_3CH_2)_2NCH_3 + H_2O$$

*Example 11*

The process of Example 1 was repeated using 59 parts of di-2-(ethoxymethoxypropyl)amine, 7.6 parts of formaldehyde, 50 parts of methanol, and 20 parts of the nickel catalyst. The reaction was conducted at a temperature of 97 to 104° C. under a hydrogen pressure of 400 atmospheres and for 1.5 hours. The N-methyl substitution product was obtained in a conversion of 94.5%.

*Example 12*

The process of Example 1 was repeated using 42.6 parts of di-2-(ethoxymethoxypropyl)amine, 5.45 parts of formaldehyde, 46 parts of methanol, and 10 parts of the nickel catalyst. The reaction was conducted at a temperature of 85 to 104° C. under a hydrogen pressure of 30 atmospheres and for 1.25 hours. The N-methyl substitution product was obtained in a conversion of 89.5%.

Properties of some of the new compositions of matter prepared in accord with the examples are: N-methyl-di-[(isobutoxymethoxy)ethyl] amine, ((C$_4$H$_9$OCH$_2$OCH$_2$CH$_2$)$_2$NCH$_3$, colorless liquid, B. P. 144–145.5° C./6 mm., neutral equivalent, 291; N-dimethyl 2-[(ethoxymethoxy)propyl] amine, C$_2$H$_5$OCH$_2$OCHCH$_3$CH$_2$N(CH$_2$)$_2$, colorless liquid, B. P. 81° C./40 mm., neutral equivalent, 161; N-isopropyl-di[(ethoxymethoxy)ethyl] amine, ((C$_2$H$_5$OCH$_2$OCH$_2$CH$_2$)$_2$NCH(CH$_3$)$_2$), colorless liquid, B. P. 196–198° C./95 mm.

The synthesis may, if desired be carried out by way of a continuous process as distinguished from a batchwise process. By such a process the (alkoxyalkoxyalkyl) amines, together with aldehyde or ketone and hydrogen, are introduced continuously with or without a solvent into a reaction zone which may, for example, be a cylindrical converter in which the ratio of diameter to length is not greater than 1 to 10. The converter is charged with the catalyst and with substantially no free space at the inlet end so that substantially immediately after the introduction of the reactants they directly contact a relatively large volume of the catalyst under the temperature and pressure of the alkylation. This type of converter avoids undue mixing of the product with the reactants, and thereby inhibits the formation of reaction products resulting from such mixtures.

We claim:

1. A process for the isopropylation of a di-(alkoxymethoxyalkyl) amine which comprises subjecting a di-(alkoxymethoxyalkyl) amine to a reaction in the presence of acetone and hydrogen at a temperature between 25 and 200° C. and a pressure between 1 and 1000 atmospheres in the presence of a hydrogenation catalyst.

2. A process for the isopropylation of di-(ethoxymethoxyethyl) amine which comprises subjecting 18 parts of di-(ethoxymethoxyethyl) amine and 10 parts of acetone to hydrogenation in the presence of a nickel hydrogenation catalyst at temperatures of about 100° C. and a pressure of about 100 atmospheres.

3. A process for the isopropylation of di-(isobutoxymethoxyethyl) amine which comprises subjecting about 55 parts of di-(isobutoxymethoxyethyl) amine and about 30 parts of acetone to hydrogenation in the presence of a nickel catalyst at a temperature between 100 and 102° C. and under pressure of about 30 atmospheres.

4. N-isopropyl di-[(ethoxymethoxy)ethyl] amine.

DONALD J. LODER.
WILLIAM F. GRESHAM.

REFERENCES CITED

The following references are of record in the file of this patent:

UNITED STATES PATENTS

| Number | Name | Date |
|--------|------|------|
| 2,194,294 | Cass et al. | Mar. 19, 1940 |
| 2,425,628 | Loder et al. | Aug. 12, 1947 |

OTHER REFERENCES

Degering, "Organic Nitrogen Compounds," (University Lithoprinters, Ypsilanti, Michigan, 1945), pages 203–204, paragraphs 603–604.